UNITED STATES PATENT OFFICE.

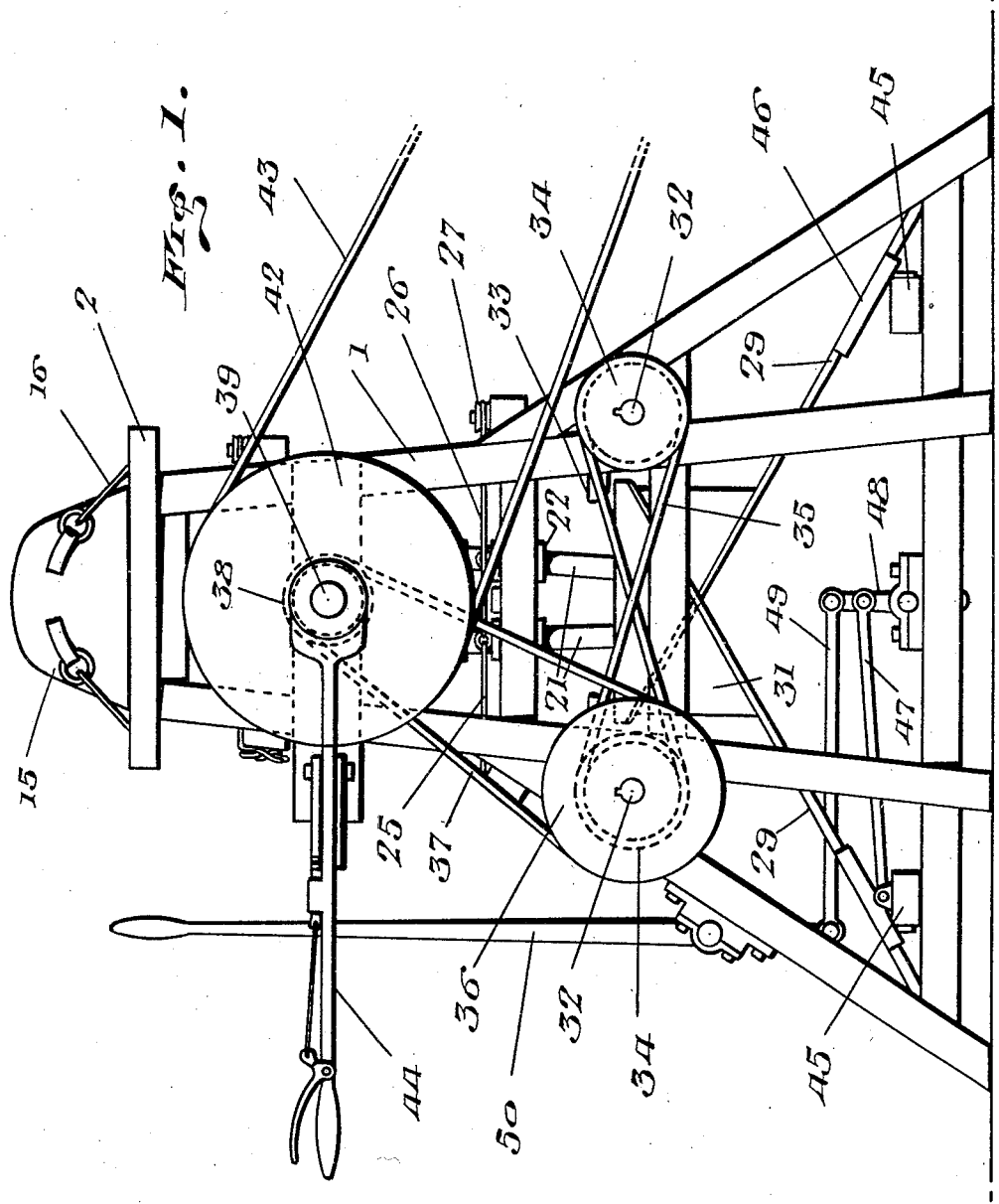

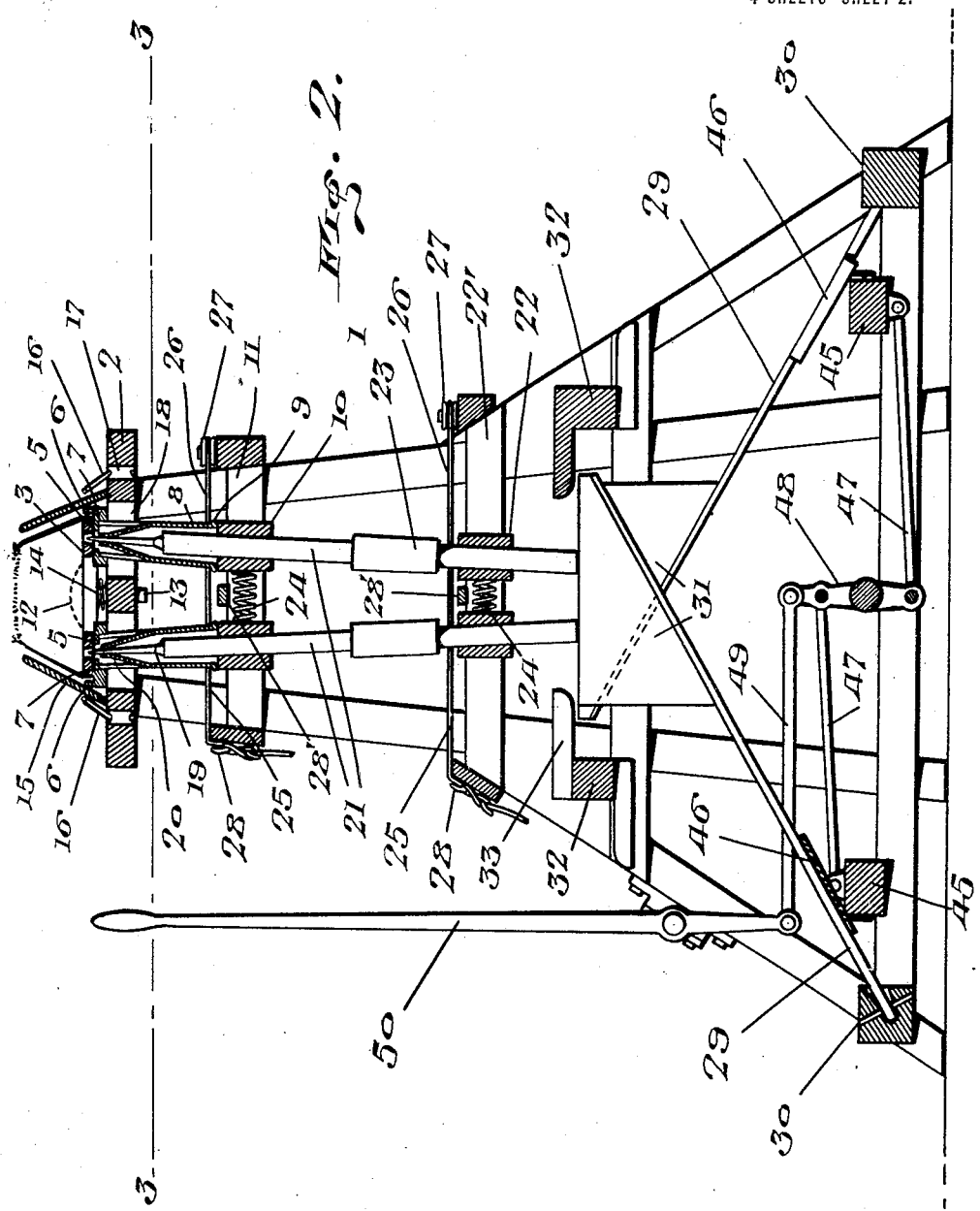

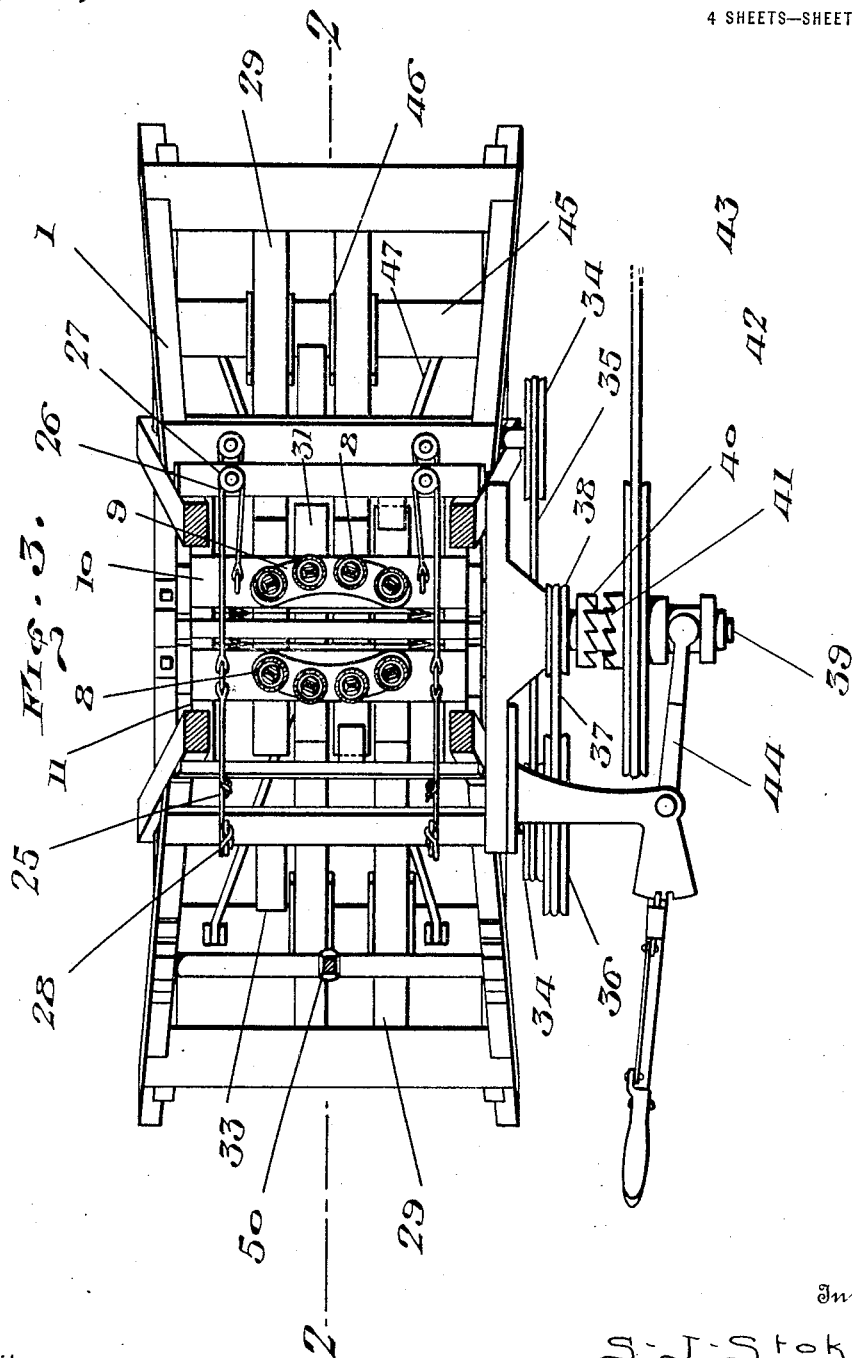

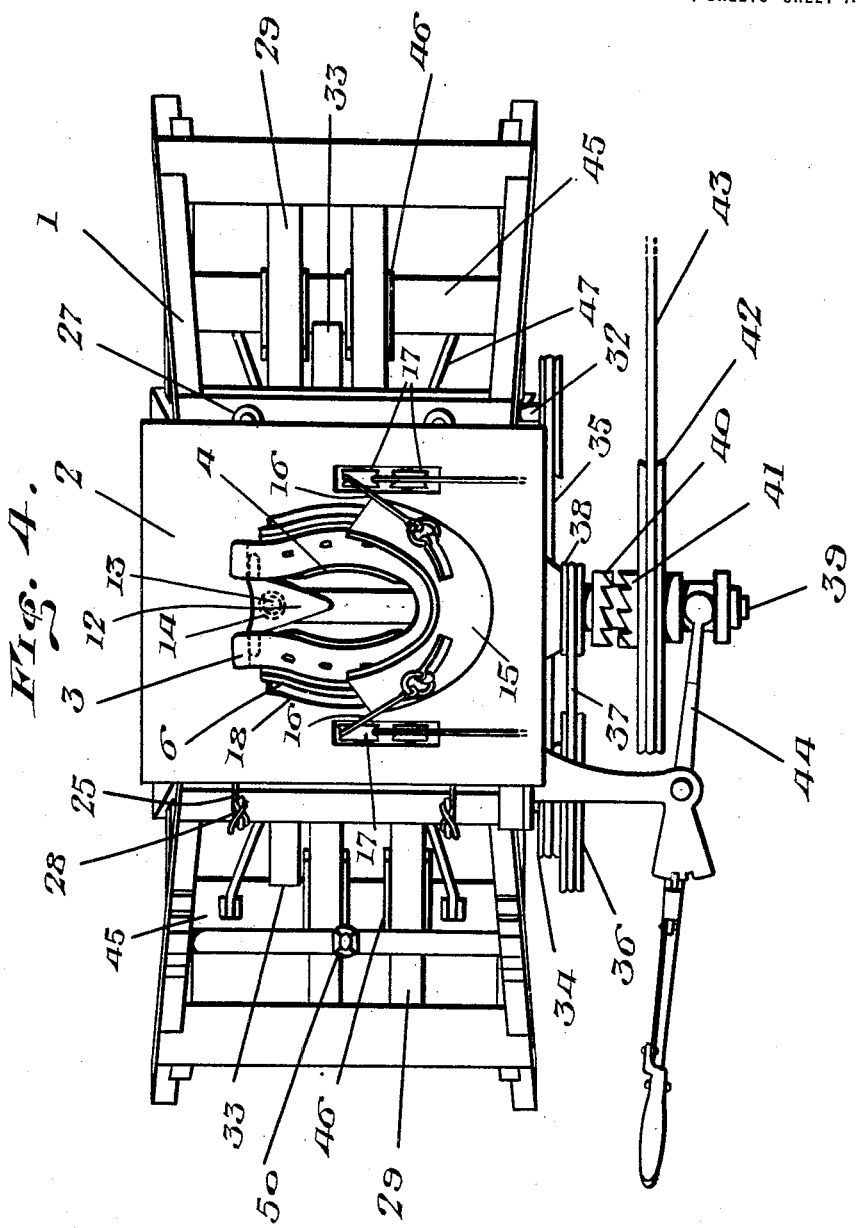

SAMUEL J. STOKES, OF KANSAS CITY, MISSOURI.

HORSESHOEING-MACHINE.

1,331,594.   Specification of Letters Patent.   Patented Feb. 24, 1920.

Application filed September 3, 1919. Serial No. 321,403.

*To all whom it may concern:*

Be it known that I, SAMUEL J. STOKES, a citizen of the United States, residing at Kansas City, in the county of Jackson and State of Missouri, have invented certain new and useful Improvements in Horseshoeing-Machines; and I do hereby declare the following to be a full, clear, and exact description of the invention, such as will enable others skilled in the art to which it appertains to make and use the same.

The present invention relates to a machine for automatically nailing horseshoes to the hoofs, and aims to provide a novel and useful machine of that character.

Another object is to provide a machine having novel means for holding the nails and enabling adjustments to be made for various sizes and shapes of horseshoes, so that the nails can be driven up through the shoe into the hoof.

A further object is the provision of novel mechanism for driving the nails in an effective and rapid manner.

A still further object is the provision of novel means of holding the hoof in place, during the driving of the nails.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the machine,

Fig. 2 is a vertical section taken on the line 2—2 of Fig. 3,

Fig. 3 is a horizontal section taken on the line 3—3 of Fig. 2, and

Fig. 4 is a plan view of the machine.

The machine is provided with a suitable frame 1 having the top 2 on which the hoof is placed and held. This frame can be disposed underneath or at one side of a platform or floor on which the horse is standing, whereby the hoofs can be placed on the frame in succession in shoeing the horse.

The horseshoe 3 is supported on a pair of arcuate plates 4 forming seats for said shoe, and these plates 4 have apertures 5 for the passage of the nails up through the shoe.
The outer edges of the plates 4 have upstanding arcuate flanges 6 to fit the side edges of the shoe and hold it in position. The plates 4 have lower grooves 7 receiving the upper ends of two sets of tubular nail holders 8, the lower ends of which are secured to plates 9 which are in turn supported on the respective slide bars 10, the ends of which are slidably supported by guides 11 carried by the frame. The plates 4 are thus mounted loosely on the upper ends of the nail holders 8, to permit said nail holders to tilt to different angles, with the plates 4 horizontal to bear flatly against the bottom of the shoe. The shoe is thus supported on the plates 4 which are in turn supported by the nail holders 8 and slide bars 10, and said plates 4 can seat on the top 2 to relieve the nail holders 8 and bars 10 of considerable weight and pressure.

In order to hold the hoof on the shoe 3, a frog-piece 12 is disposed on the top 2 between the plates 4 at one end thereof, and has a stem 13 slidable in said top. A spring 14 yieldably raises the piece 12 so as to fit within the frog of the hoof. A hoof plate 15, curved to fit around the front and sides of the hoof, is pulled rearwardly and downwardly against the hoof, to hold the same down on the machine, assisted by the frog-piece 12. Cords or flexible elements 16 are connected to the hoof plate 15 and extend downwardly and then upwardly around pulleys 17 mounted in openings in the top 2 at opposite sides of the plates 4, so that the operator can take hold of said cords 16 and pull them to hold the plate 15 tightly against the hoof during the operation of the machine. Then, when the cords 16 are released, the hoof can be removed.

The top 2 has openings 18 accommodating the nail holders 8 for transverse movement thereof so that said nail holders can be positioned at different distances apart and at different angles to suit various horseshoes and hoofs. The nails 19 are placed head down in the holders 8, and said holders are provided near their upper ends with opposite instruck upwardly converging tongues 20 which grip the nails between them and hold them in place with the pointed ends of the nails entering the holes or apertures in the horseshoe, as seen in Fig. 2. These friction spring tongues 20 thus hold the nails in place until driven through the shoe into the hoof. The plates 9 bear loosely on the bars 10, permitting the nail holders 8 to tilt to different positions, and also permitting said nail holders to be lifted up through the openings 18 for inserting the nails from below into place to be held by the tongues or fingers 20.

Nail-driving plungers 21 are slidable through the bars 10 and through a similar set of slide bars 22 having their ends slidable along guides 22' of the frame below the bars 10, with the upper ends of said plungers entering the nail holders to strike upwardly against the heads of the nails. Said plungers 21 have enlargements 23 to seat on the lower bars 22 for supporting said plungers in their lowermost position. The plungers 21 are sufficiently loose in the bars 10 and 22 to enable said bars to be slid transversely to arrange the plungers 21 and nail holders 8 in various angular positions.

As a means for obtaining the adjustment of the nail holders to different distances apart and to different angles, coiled wire retractile springs 24 connect the bars 10 and also the bars 22, thereby pulling the bars of each pair toward one another. Cords or other flexible elements 25 are connected to one bar of each pair, and other cords 26 are connected to said bars and pass around pulleys 27 and are then connected to the other bars, so that when the cords 25 are pulled, this will separate the bars against the tension of the springs. Cleats 28 are carried by the frame for the attachment of the cords 25 to hold the bars separated in the desired distances when the adjustments have been made. When the cords 25 are released, the bars are moved toward one another against the stop strips 28' between them. Thus, by adjusting the bars 10 and 22, the nail holders 8 and plates 4 can not only be moved to different distances apart for accommodating horseshoes of different sizes and widths, but by adjusting the bars different distances relatively to one another, the nail holders 8 and plungers 21 can be tilted to different angles, according to the hoofs. Thus, the lower ends of the plungers 21 can be brought closer together for driving the nails outwardly at a greater angle from a vertical line, or nails can be driven upwardly more nearly in the vertical line, as desired.

The striking force for driving the nails is derived from a striking mechanism including leaf springs 29 pivotally or hingedly connected, as at 30, to opposite ends of the base of the frame, and these springs extend inwardly and upwardly in crossing relation side by side, and have strikers 31 secured on the upper free ends thereof to contact with the lower ends of the plungers 21 that extend below the bars 22. The strikers 31 are depressed alternately by means of transverse shafts 32 mounted for rotation in the frame above the springs 29 at the opposite sides of the strikers, and having arms 33 to bear on the strikers at the free ends of the springs and depress said strikers and then release the same so that the springs in being bent downwardly will cause the strikers to rebound and strike the plungers 21 with considerable impact. The shafts 32 are operatively connected by means of pulleys 34 secured thereon and connected by a crossed belt 35, and a pulley wheel 36 secured to one shaft 32 is connected by a belt 37 with a pulley wheel 38 mounted on a stub 39 supported by one side of the frame. Said pulley 38 has a clutch hub 40 for the engagement of a clutch hub 41 of a driving pulley wheel 42 mounted slidably on the stub 39, and said pulley wheel 42 is driven by a belt 43 from an engine or other suitable source of power, although, in some cases, the machine can be driven by hand. A lever 44 is carried by the frame for shifting the pulley wheel 42 to open and close the clutch, so that the nail-driving mechanism can be started and stopped at will.

The nail-driving mechanism is brought into operation gradually for driving the nails into place, and for this purpose, a transverse bar 45 is slidable on the base of the frame under each set of leaf springs 29, and has pivotally mounted thereon a pressure plate 46 for each spring 29 fitting slidably against the lower surface of said spring. The bars 45 are connected by links 47 with a lever 48 that is in turn connected by a link 49 with a hand-lever 50, whereby the bars 45 can be slid toward and away from the springs 29. Therefore, when the bars 45 are moved toward one another, the springs 29 which bear on the plates 46, will drop downwardly accordingly, and can thus be lowered to render the strikers inoperative. Then, as the lever 50 is swung to gradually move the bars 45 away from one another, they will raise the springs 29, so that the arms 33 come into action for depressing the strikers and releasing them so that they strike the plungers 21. The farther the bars 45 are moved, the higher the springs 29 are raised, and this will increase the force of impact of the strikers against the plungers, as well as driving the plungers higher and higher. The strikers are operated rapidly by the rotation of the shafts 32, thus obtaining a rapid vibratory driving action, and as the springs 29 are brought under greater and greater pressure by the movement of the bars 45, the nails will be gradually driven home.

In operation, the nails 19 are first inserted in the holders 8 and said holders are then adjusted to the shoe 3 which is placed on the plates 4. The hoof is then placed on the shoe and held down by the hoof plate 15 and frog-piece 12. The operating mechanism is then brought into operation by closing the clutch, which will bring the shafts 32 into operation. The nails are then driven by swinging the hand-lever 50 to gradually bring the strikers 31 into position to be operated on by the arms 33, so that said strikers will impinge against the lower ends of the plungers 21. This will start the nails upwardly, and by continuing the movement of the lever 50, the plungers 21 are driven higher and higher until the nails are driven home. The ends can then be cut off and clenched down as usual.

Having thus described the invention, what is claimed as new is:—

1. A horseshoeing machine comprising means for holding the hoof, and a plurality of means for individually driving nails upwardly from underneath.

2. A machine for shoeing horses, comprising hoof-holding means, nail-holding means below the same, and nail-driving means operable in the nail-holding means for delivering a succession of blows for driving the nails upwardly.

3. A horseshoeing machine comprising nail-holding means, means above said means for supporting a horseshoe, nail-driving plungers working in said holders, and means for delivering blows to said plungers.

4. A horseshoeing machine comprising means for supporting a horseshoe, means for holding the hoof down on said shoe, nail-driving means operable from underneath for delivering a succession of blows for driving nails into the hoof, and means for advancing the nail-driving means.

5. A horseshoeing machine comprising nail-holding members, means for mounting said members for relative adjustment and for placing them in various angular positions to place the nails for entry through the horseshoe into the hoof, and means for driving the nails including driving portions adjustable with said nail-holding members.

6. A horseshoeing machine comprising nail holders, means for mounting said holders for adjustment, nail-driving plungers working within and adjustable with said holders, and striking means to operate against said plungers.

7. A horseshoeing machine comprising a frame, plates thereon for supporting the opposite side portions of a horseshoe, nail holders underneath said plates loosely engaging the same, means for supporting said holders for adjustment to different positions, and nail-driving means operable in said holders.

8. A horseshoeing machine comprising adjustable bars, nail holders on said bars, nail-driving plungers slidable through said bars and projecting within the nail holders, and striking means to operate against said plungers.

9. A horseshoeing machine comprising a frame, a pair of plates thereon for supporting the side portions of a horseshoe, adjustable bars carried by the frame, nail holders between said bars and plates, nail-driving plungers slidable through said bars and working within said holders, and striking means for operating said plungers.

10. A horseshoeing machine comprising a frame, upper and lower pairs of bars supported by the frame for adjustment toward and away from one another, nail holders supported by the upper bars for adjustment to different positions, nail-driving plungers slidable through the upper and lower bars to work within said holders, and striking means for operating said plungers.

11. A horseshoeing machine comprising means for accommodating and holding a hoof and a horseshoe, nail-holding means having parts adjustable to the size of the shoe and adjustable to different angles with respect to the shoe to position the nails for entry through the shoe into the hoof, and nail-driving means operable to drive the nails from the holding means into the hoof.

12. In a machine of the character described, a tubular nail holder having spring nail-holding fingers converging therein toward one end, and a nail-driving plunger entering said holder from the opposite end.

13. A horseshoeing machine comprising a frame, a pair of plates thereon for supporting the side portions of a horseshoe and movable toward and away from one another, means for holding a hoof on the shoe supported by said plates, bars carried by the frame for adjustment toward and away from one another, nail holders between said bars and plates adjustable to different positions with said plates and bars, a pair of lower bars carried by the frame for adjustment toward and away from one another, plungers slidable through the first-named and second-named bars and projecting within the holders for driving the nails upwardly through the shoe into the hoof, and striking means below the plungers for driving them upwardly.

14. A horseshoeing machine comprising means for supporting a horseshoe, means for driving nails through the shoe into the hoof, a yieldable frog-piece to fit the frog of the hoof, and means for holding the hoof down.

15. In a machine of the character described, a nail-driving plunger, a striker to operate said plunger, spring means for moving said striker against the plunger, means for moving the striker away from the plunger and releasing it, and means for advancing the spring means toward the plunger.

16. In a machine of the character described, a nail-driving plunger, a leaf spring, a striker carried by said spring to move against the plunger, means for moving the striker away from the plunger and releasing it, and means for moving said spring toward the plunger.

17. In a machine of the character described, a nail-driving plunger, a striker to operate against said plunger, spring means carrying said striker for moving it against the plunger, means for repeatedly moving the striker away from the plunger and releasing it, and means controlling said spring means for advancing the striker toward the plunger.

18. In a machine of the character described, a nail-driving plunger, a leaf spring, a striker carried by said spring to hit the plunger, means for repeatedly moving the striker away from the plunger and releasing it to vibrate the striker, and means for operating on said spring to advance the striker during the vibrations thereof.

19. In a machine of the character described, a plurality of adjustable nail-driving plungers, a plurality of springs, strikers carried by the springs for hitting against said plungers, rotatable shafts having arms for moving said strikers away from the plungers and releasing them, and means for advancing the springs to move the strikers toward the plungers.

20. In a machine of the character described, a plurality of adjustable nail-driving plungers, leaf springs, strikers carried by said springs to hit against the plungers in their different positions, rotatable shafts having arms to move said strikers away from the plungers and release them, and manually-controlled means for advancing said springs to move the strikers toward the plungers.

In testimony whereof I have signed my name to this specification in the presence of two subscribing witnesses.

SAMUEL J. STOKES.

Witnesses:
OLIVE BOND,
M. H. VANDERVEER.